L. Dederick.
Sleeping Collar.
No. 4,193. Reissued Dec. 6, 1870.
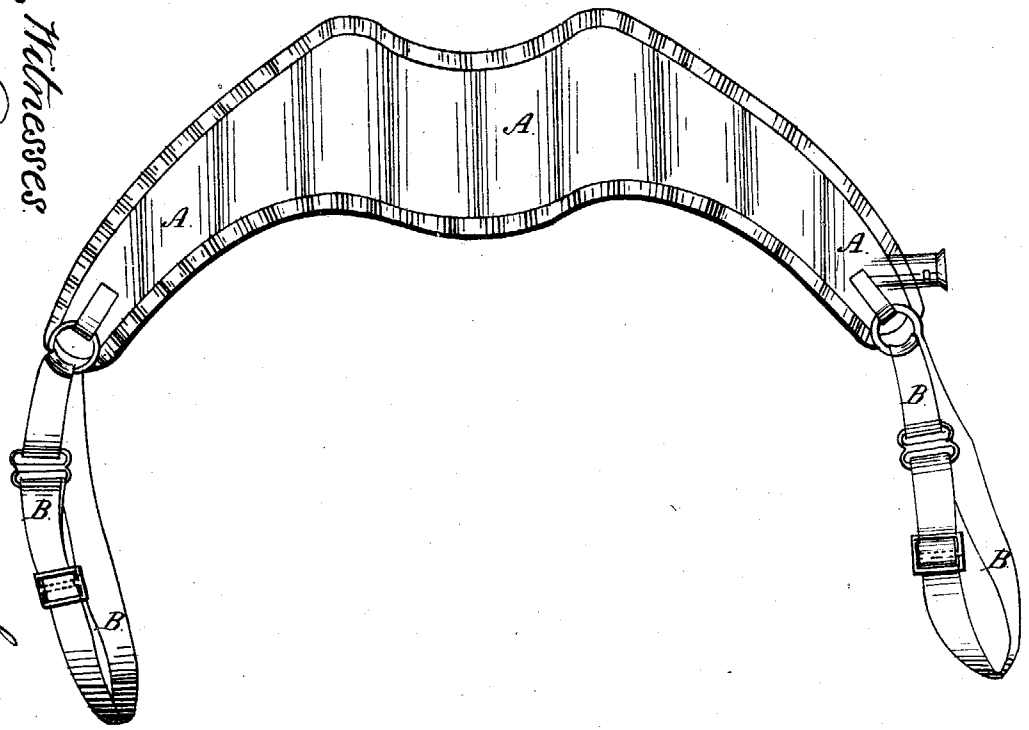
Witnesses.
Gustave Dieterich
A. W. Almquist
Inventor.
Levi Dederick
PER Munn & Co
N. PETERS, PHOTO-LITHOGRAPHER, WASHINGTON, D. C.

United States Patent Office.

LEVI DEDERICK, OF NEW YORK, N. Y.

Letters Patent No. 103,026, dated May 17, 1870; reissue No. 4,193, dated December 6, 1870.

IMPROVEMENT IN SLEEPING-COLLARS.

The Schedule referred to in these Letters Patent and making part of the same.

*To all whom it may concern:*

Be it known that I, LEVI DEDERICK, of the city, county, and State of New York, have invented a new and useful Improvement in Traveler's Sleeping-Collars; and I do hereby declare that the following is a full, clear, and exact description thereof, which will enable others skilled in the art to make and use the same, reference being had to the accompanying drawing forming part of this specification, in which the figure represents my improved collar opened out.

My invention has for its object to furnish an improved collar, by means of which a traveler may be able to support his head while sitting in a railroad car or other conveyance, so as to sleep comfortably; and It consists, first, of the combination of a collar with straps extending from the collar to the arms or other attachment in order to hold or counterbalance the head, in part, by means of such straps; and secondly, it consists of a collar constructed and provided with straps, as hereinafter more fully described.

In the drawing—

A represents a collar, which must be of sufficient breadth to reach to and support the back part of the head while resting upon the shoulders, and of sufficient stiffness or body to prevent it from crushing down about the neck, so as not properly to support he head.

At or near the ends of the collar are attached straps B, made into loops, and which should be provided with slides or buckles, so that the said loops may be contracted or extended as may be required.

The collar A may be of any suitable material and form, and may receive the necessary stiffness from being made of several thicknesses, from quilting, stuffing, whalebone, or other suitable means of stiffness, but I prefer to make it of two thicknesses of rubber-cloth or other material impervious to air.

In this case it should be provided with an air-tube, C, having a nut, through which tube air may be blown into the collar in order to inflate and stiffen the same, and then the nut, cap, or stopper inserted to close the tube and thus prevent the air from escaping.

The rubber-cloth may be made thicker in alternate strips or ribbed, so that the collar when inflated may be corrugated transversely, as shown in the drawing, to serve as stays to stiffen it and prevent the sides of the collar from becoming too oval when inflated.

This construction enables the collar, when the air is forced out, to be folded into very small compass, so that it may be conveniently carried in a traveling-bag or even in the pocket, requiring but little more space than a pocket handkerchief.

In using the collar it is passed around the back of the neck, and the fore-arms are passed through the loops of the straps B, said loops being so adjusted in length that the arms when passed through them may rest in an easy position.

By this means the weight of the hands and arms will support the head and enable the traveller to sleep comfortably.

If desired, the straps B may be lengthened so that their loops may be passed over the feet or around the legs of the traveler, or they may be attached to any other convenient support.

When from the unevenness of the road or other cause the head has a tendency to roll, the straps B may be crossed upon the breast before passing the hands through them, bringing the collar A closer around the neck and thus better supporting the head.

I claim—

1. The sleeping-collar A as described, and for the purpose set forth.

2. In combination with the sleeping-collar the separate, adjustable, and looped straps B B′, substantially as described for the purposes set forth.

LEVI DEDERICK.

Witnesses:

STEWART J. DEDERICK,

WM. P. DUNSHEE.